J. STRYKER.
Cultivator.
No. 12,744.
Patented Apr. 17, 1855.
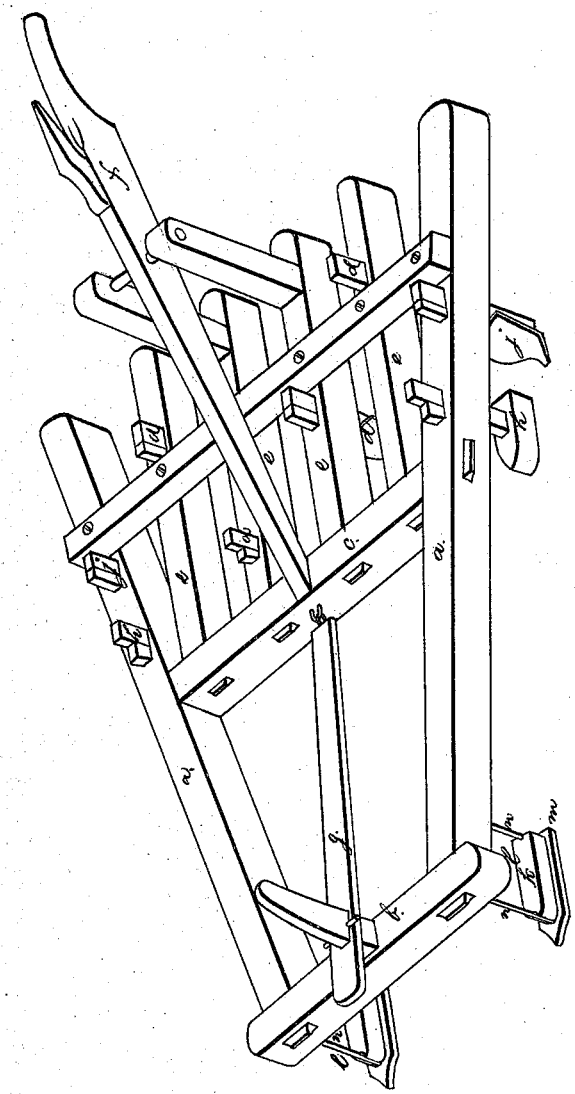

UNITED STATES PATENT OFFICE.

JOHN STRYKER, OF SIX MILE RUN, NEW JERSEY.

IMPROVEMENT IN CULTIVATORS.

Specification forming part of Letters Patent No. 12,744, dated April 17, 1855.

*To all whom it may concern:*

Be it known that I, JOHN STRYKER, of Six Mile Run, in the county of Somerset and State of New Jersey, have invented certain new and useful Improvements in Cultivators, denominated "Stryker's Cultivators;" and I do hereby declare that the following is a full, clear, and exact description thereof, reference being had to the accompanying drawing, making a part of this specification, which represents an isometrical view of a cultivator with my improvements applied.

The nature of my invention consists in the manner or method of supporting or sustaining a cultivator in front and rear and regulating the action of its plows or colters in or upon the ground without the zigzag, serpentine, and unsteady movement which is common to and a great obstacle to the successful operation of the ordinary wheel-cultivator; and the implement is also rendered more convenient, as well as efficient, in the performance of its work, and less draft-power is required than ordinarily in working any and all kinds of soil with it.

In said drawing, $a$ $a$ are the two outside beams of the frame, which converge at their front ends, and are connected permanently together, by mortises and tenons, by the cross-beams $b$ and $c$.

$d$ are the inside plows or colters, arranged in the parallel beams $e$, which may be permanent with the frame or movable, so as to be separated or drawn closer together, to regulate the distance between the colters, as may be desired.

$f$ is the helve or handle, by which the implement is held and guided, one handle being sufficient to govern and guide this construction of implement in a perfect manner, whereas others require two handles. This arrangement renders the implement peculiarly applicable to the cultivation of Indian corn, the plowman or operator being able to manage it with perfect ease while walking in the middle of the furrows, on one side, out of the way of the young corn. The implement works over the rows and not between them.

$g$ is the tongue or draft beam to which the horses or animals are attached, which is capable of adjustment so as to obtain a proper angle of draft.

The implement thus far, with the exception of the single handle, is the same in construction as ordinary cultivators. In my cultivator I dispense with the use of wheels entirely, and elevate and sustain the machine upon supports placed at the front and rear end of the frame. These supports elevate the machine, serving as wheels, and regulate the action of the colters in the ground. The front ones, $l$ $l$, are permanently attached to the front ends of the side beams, and they are constructed of pieces of metal, $m$, secured permanently to the two rods $n$ $n$, which are bolted or suitably secured to the front ends of the said side beams.

Pieces of wood may be placed on the tops of the metal plates $m$ to strengthen the rods $n$ $n$; but they are not absolutely necessary, and if found to increase the bulk of the supports may be dispensed with.

The rear supports, $h$ $h$, are movable and adjustable in the said side beams, and they are constructed of pieces of metal permanently secured to shanks which pass through mortises in the said side beams, and are secured therein by wedges in the manner of the shanks of common plows. These are placed immediately in front of the outside colters or plows in the said outside beams, and serve not only as supports or sustainers to the rear end of the frame of the machine, but they regulate and govern the depth of action of all the colters in the ground. In working soil which has become hard—either corn or fallow land—these supports should be set from one to two inches from the bottoms of the outside plows; but if the soil is mellow, they require frequently to be lowered down even or flush with the bottoms of the plows, and sometimes in very soft soil even lower. Care should be taken that both these rear supports be adjusted to equal height, and if the ground should prove too hard for the weight of the machine, lay sufficient weight upon the center of it to make it do its work. These and the front supports present greater surface to the ground than wheels, and for this and other reasons they do not sink so deep into the ground. They slide instead of roll over the ground, so that loose clods of earth, stones, &c., will have comparatively no effect in retarding or misdirecting the progress of the machine over the ground, for instead of passing over such obstacles in the manner of wheels, which would necessarily lift or elevate the machine, they slide under and remove such obstructions to one side, out of the way, and they enable the machine to be propelled with much less draft-power, to be handled with more ease, and to perform its work in a perfect and satisfactory manner.

Having thus fully described my invention, what I claim as new, and desire to secure by Letters Patent, is—

The application or use of front and rear supports or supporters, which not only answer all the purposes of wheels, but regulate and govern the action of the colters in the ground, constructed and arranged substantially as in the manner and for the purpose herein set forth.

In testimony whereof I have hereunto signed my name before two subscribing witnesses.

JOHN STRYKER.

Witnesses:
  JOHN L. SMITH,
  LUCIEN E. KING.